March 18, 1930.　　W. H. D'ARDENNE ET AL　　1,751,077
AUTOMATIC WELDING
Original Filed Sept. 12, 1925　　6 Sheets-Sheet 4
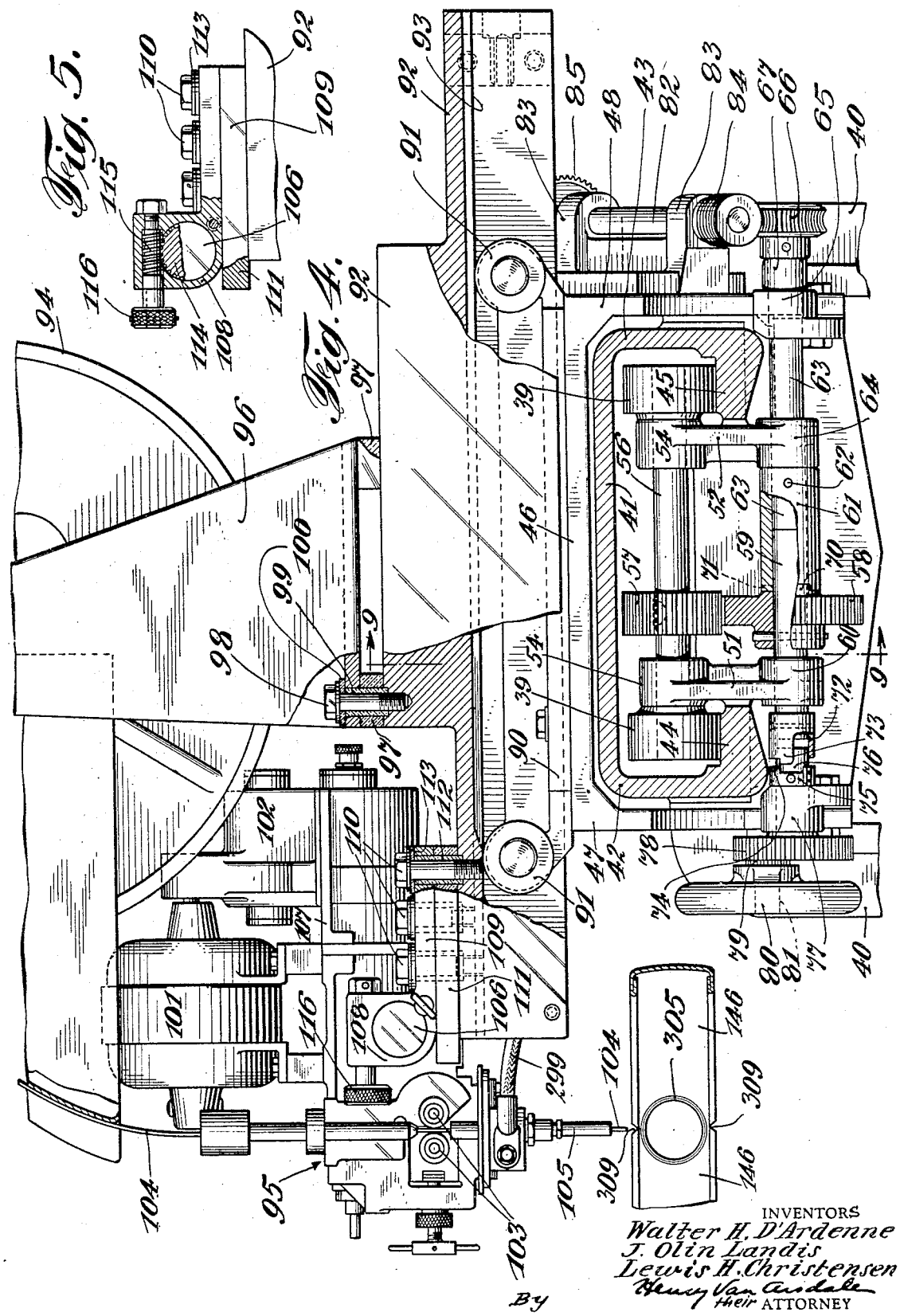
INVENTORS
Walter H. D'Ardenne
J. Olin Landis
Lewis H. Christensen
Henry Van Arsdale
By their ATTORNEY

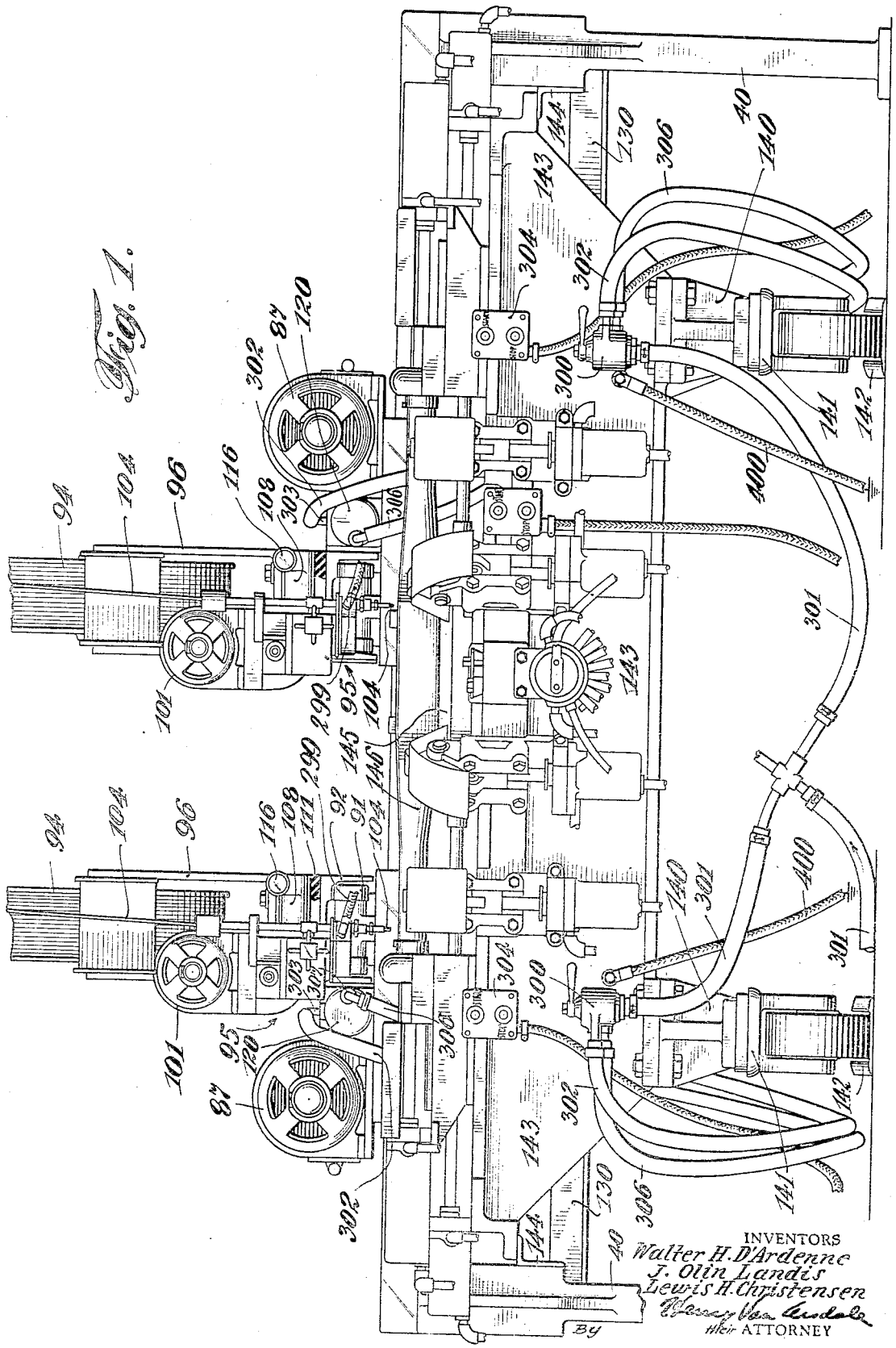

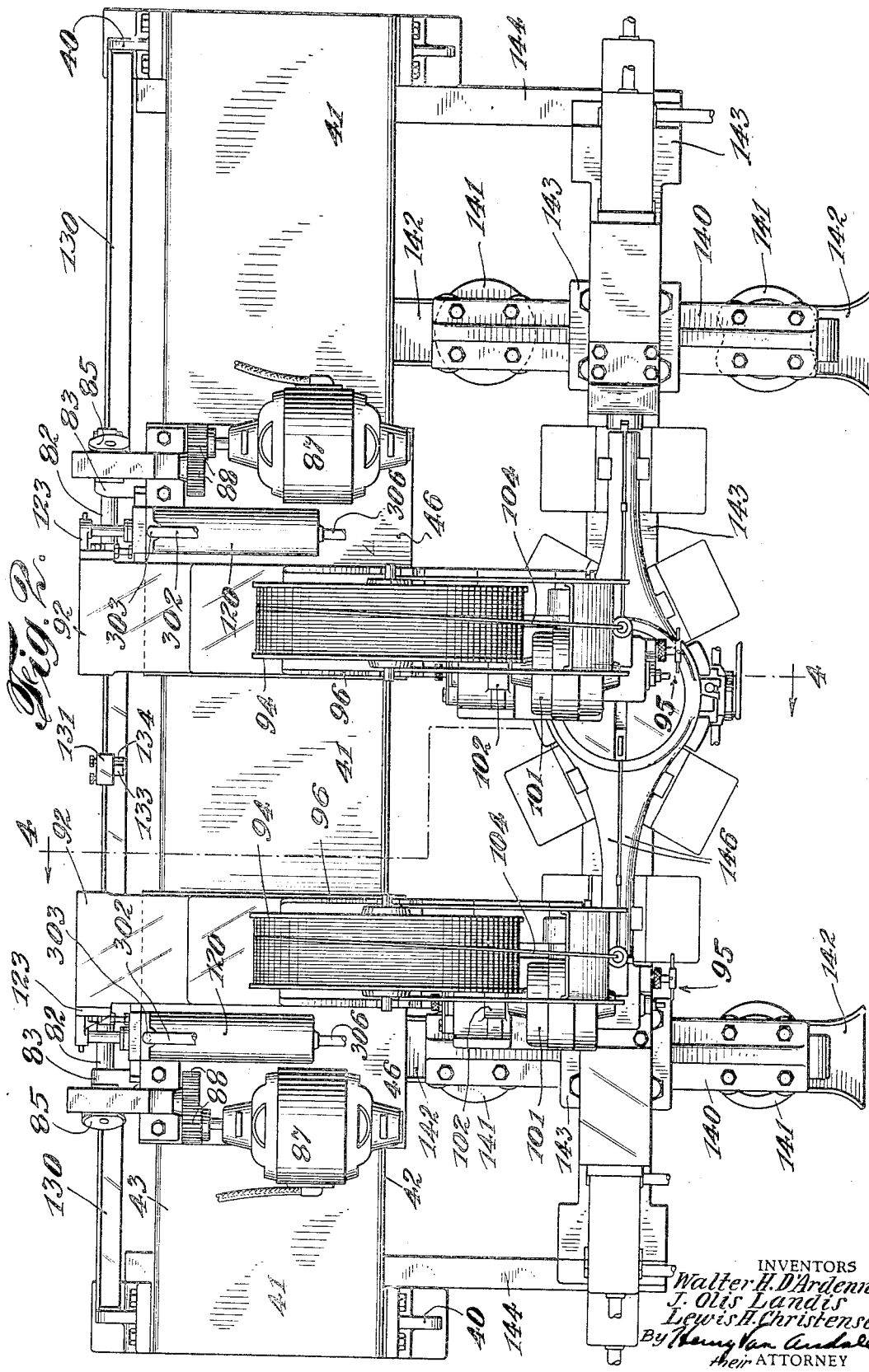

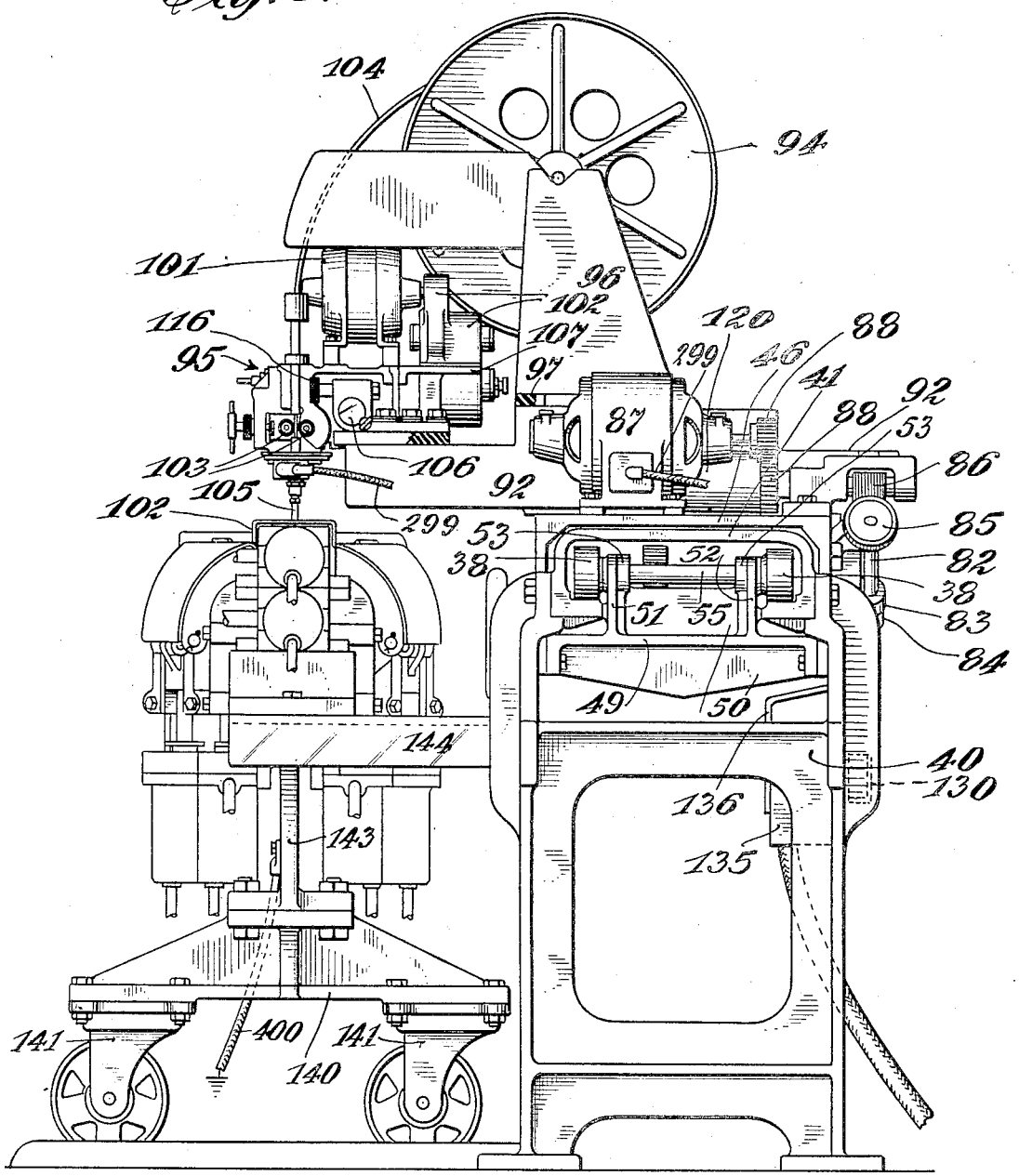

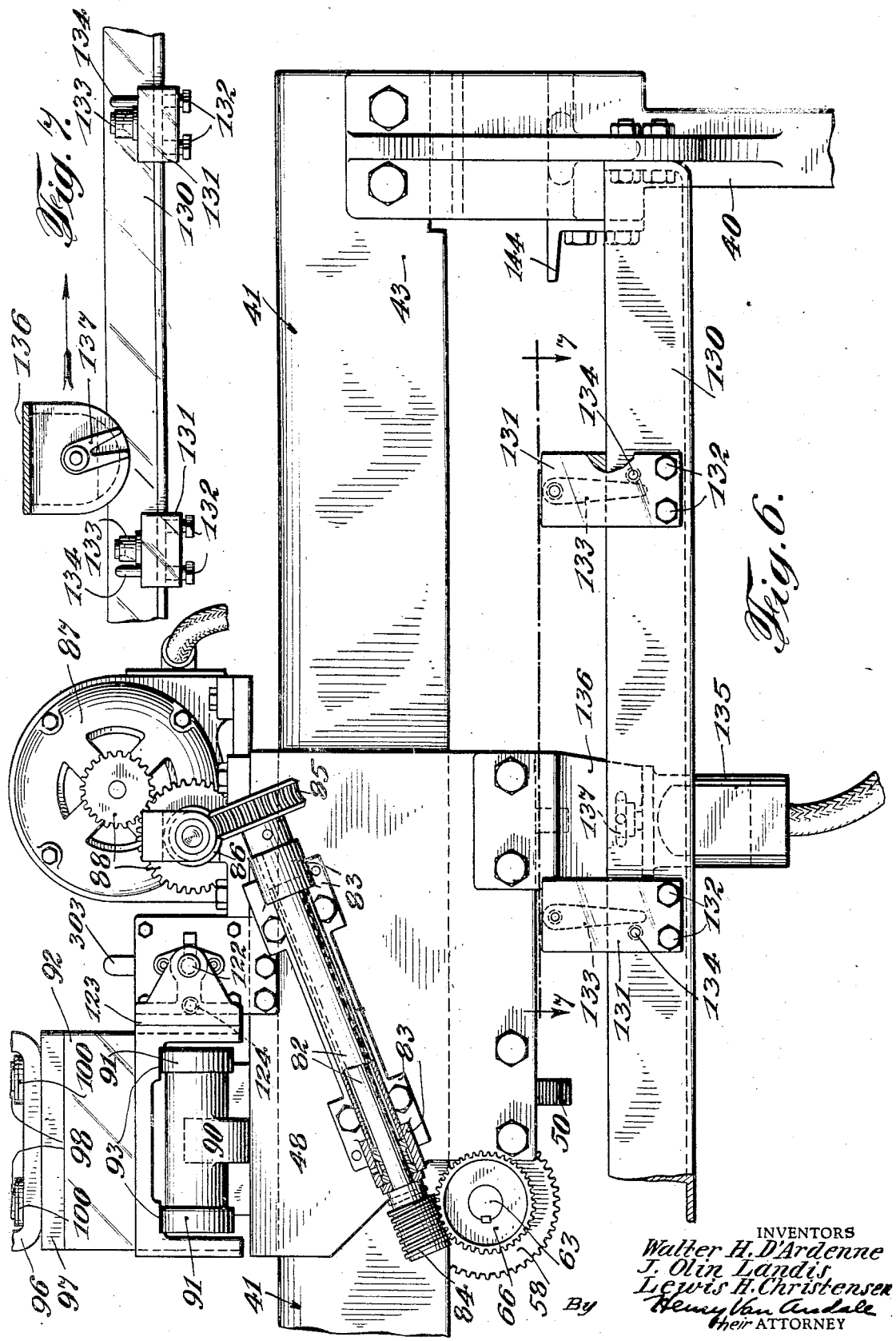

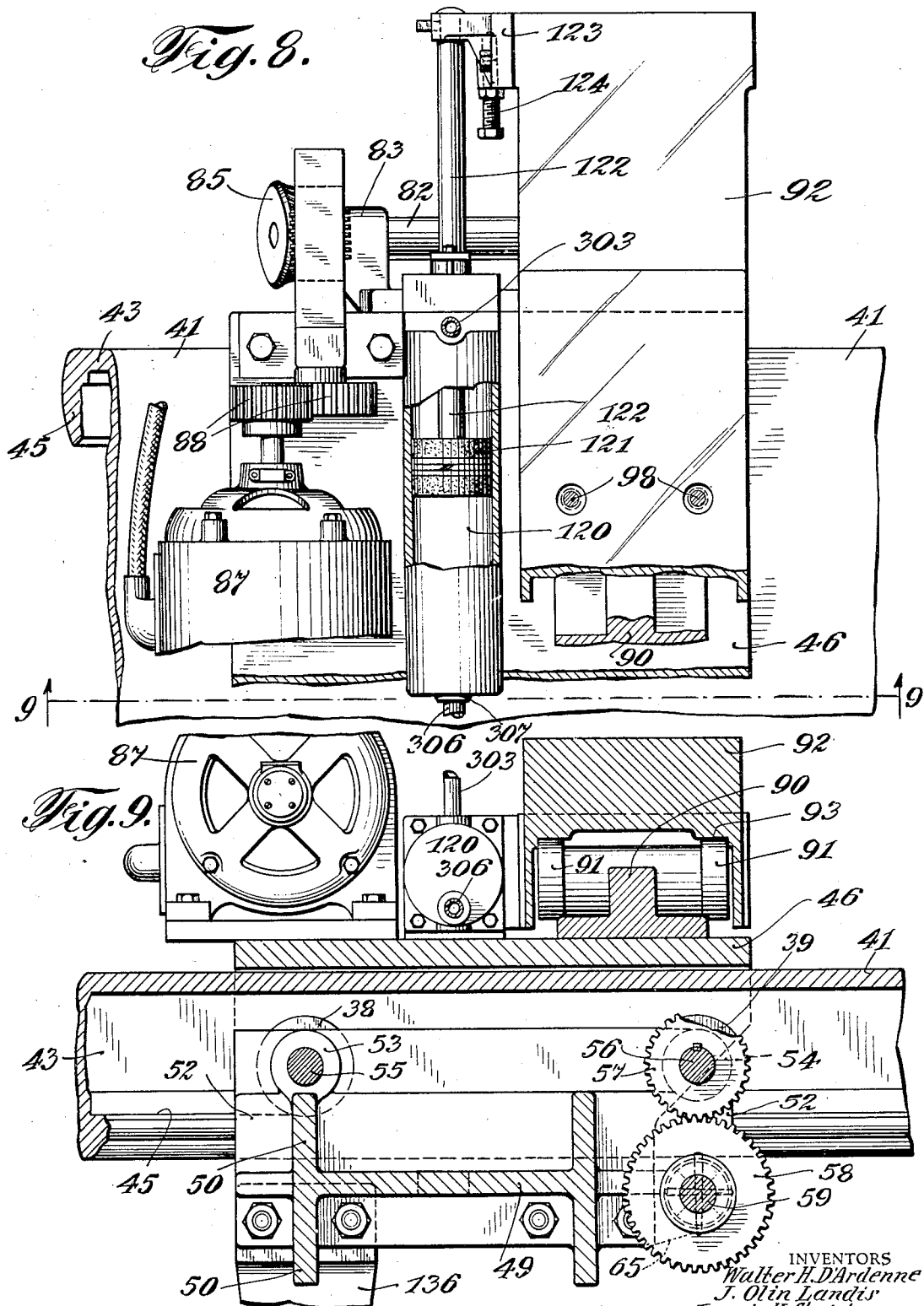

Patented Mar. 18, 1930

1,751,077

UNITED STATES PATENT OFFICE

WALTER H. D'ARDENNE, J. OLIN LANDIS, AND LEWIS H. CHRISTENSEN, OF PHILADELPHIA, PENNSYLVANIA, ASSIGNORS TO HEINTZ MANUFACTURING COMPANY, OF PHILADELPHIA, PENNSYLVANIA, A CORPORATION OF PENNSYLVANIA

AUTOMATIC WELDING

Original application filed September 12, 1925, Serial No. 55,934. Divided and this application filed December 30, 1927. Serial No. 243,541.

This invention relates to automatic welding, and is a division of our application Serial No. 55,934, filed September 12, 1925. The subject matter herein more particularly relates to the automatic welding of axle housings, including improvements in the apparatus for supporting and moving the welding unit in combination with the jig carriage.

Axle housings for the rear axles and differential gearing of automobiles are well known, and conventionally comprise two longitudinal sheet metal halves seam-welded together. Sometimes bearing tubes are secured within the housing arms. Heretofore this welding has been accomplished by hand, by which is meant that the worker uses a hand welding tool. So far as applicants are aware, the welding of axle housings has not been accomplished heretofore in a satisfactory manner by means of a mechanically directed welding tool, although there are known machines for mechanically directing welding tools to weld together unstamped plates of light gauge metal, as in the manufacture of metal tanks and containers. To secure a satisfactory seam weld by a mechanically directed tool the parts to be welded together must be held together tightly or the welding will be faulty. Also, variance in the width of the seam is likely to result in faulty welding, which would be apt to be insufficient at the wider portions, or overmuch at the close portions, since the speed of movement of the mechanically directed tool would be constant. Axle housing sections are formed of heavy sheet metal stamped to shape, and the edges are apt to be slightly uneven and rough, and possibly one reason for the failure heretofore to weld them by automatic machines has been the failure to bring and hold the sections together properly. Another source of interference to proper and even seam welding arises from local magnetic fields established in the work during the welding operation, these magnetic forces deflecting the arc in various directions, sometimes entirely away from the work, and repelling the flux from the seam, with the result that the weld is faulty. These magnetic fields are more evident and stronger where heavier metal is worked upon. Therefore, an arrangement which would be satisfactory for light metal would be apt to be entirely inoperative when used for heavier metal, such as used for axle housings. This may be another reason for the failure heretofore to weld axle housings by automatic machines. The shape of the work may also have some influence on these local magnetic fields.

Applicants have invented, constructed and used a machine for welding axle housings automatically, that is, by means of a mechanically directed welding tool, and this is a principal object of this invention. By means of such a machine axle housings may be welded very quickly and in quantities at very low cost, requiring very little labor and a minimum of space The welding head, which delivers the welding wire, and the automatic means for dispensing this wire in accordance with conditions of the arc, were not invented by us, but are available in the open market, and thus replacement of these parts is less expensive than if special construction were required. We have, however, invented mechanism whereby the welding head is mechanically and automatically directed so as to weld an axle housing in a most satisfactory manner, and to produce even and good welding, without faults, along the seam, and without requiring special treatment of the edges of the housing sections to eliminate roughness and irregularities, and this is another object of our invention.

A further object of our invention is to provide an improved jig and jig carriage, which under the direction of the operator, may be readily positioned to present the work secured thereon to the automatic welding apparatus in a way which is conducive to the best of welding, and avoids faulty welding due to improper placement of the housing sections.

Another object of our invention is to provide for the easy removal of the jig from the welding mechanism to permit the easy substitution of another jig adapted to an axle housing of a different type or shape, thus providing a machine which will operate on different types and shapes of housings with the same welding apparatus.

During welding there are scattered about showers of sparks, and another object of our invention is to provide a construction wherein all parts which would be likely to suffer injury, if such sparks contacted the same, are protected from contact and injury therefrom.

Another object of our invention is to provide simple and efficient means whereby the operation of the machine may be controlled by the operator.

Broadly stated, the principal object of our invention is to provide a machine, including work holding and welding means, adapted for use in the manufacture of axle housings for automobiles, which economizes manual labor and manufacturing costs; whereby axle housings of different types may be welded in quantities, very quickly; and at the same time is reliable, producing excellent welds uniformly, and is convenient and simple to operate.

Other objects of this invention will be in part obvious and in part pointed out hereinafter.

In accordance with our invention, we provide a jig provided with means for aligning the two axle housing sections with each other, for clamping and holding them tightly together, and for presenting them to the welding apparatus for welding, and preventing distortion of the housing. The jig preferably is removable bodily from the welding apparatus to permit substitution of another jig designed for a different type or shape of housing, the same welding apparatus being adapted to various types and shapes of housings.

The welding apparatus includes two traveling welding heads, each provided with means for dispensing the wire in accordance with arc conditions during the welding. This type of head is conventional. Each head is mechanically movable transversely of the housing, into welding position thereover, and movable away from the housing to permit a welded housing to be lifted from or turned over in the jig without obstruction. Each head is also mechanically movable longitudinally along the housing, one over each end thereof, and each head welding the seam between one end and the central portion of the housing. The heads preferably move in unison in the same directions, but each head may be caused to move independently of the other. Automatic stops are provided to stop the travel when the end of the seam is reached. Automatic means are also provided for stopping the travel whenever the welding arc is extinguished. Means are also provided for returning the heads to initial position. The machine is so arranged that the operator by a simple control merely starts the mechanical travel of the welding heads, and everything else is automatic.

The machine is constructed with shielding and covering members which prevent welding sparks from harming parts which would be injured by contact therefrom.

In order that a clearer understanding of my invention may be had, attention is hereby directed to the accompanying drawings, forming a part of this application and illustrating certain possible embodiments of my invention. Referring to the drawings, Fig. 1 is a front elevation of the entire machine; Fig. 2 is a top view of the same; Fig. 3 is an end elevation of the same; Fig. 4 is a sectional view on the line 4—4 of Fig. 2; Fig. 5 is a sectional detail of the welding head adjusting mechanism; Fig. 6 is a rear elevation of a portion of the machine; Fig. 7 is a sectional detail on the line 7—7 of Fig. 6; Fig. 8 is a top view of the fragment of the machine, partly broken away; Fig. 9 is a sectional view on the line 9—9 of Figs. 4 and 8. Similar reference characters refer to similar parts throughout the several views of the drawings.

Referring to the drawings, the support for the welding apparatus includes a plurality of standards 40, to which is attached a casting 41 which extends the full length of the machine and forms an inverted channel having side walls 42 and 43 with inwardly-extending tracks 44 and 45 at their lower edges.

The welding apparatus in the embodiment shown comprises two complete units. Each unit is mounted for longitudinal movement along this table. To this end for each unit there is a casting 46, which embraces the member 41 and has side walls 47 and 48 extending outside of and below the walls 42 and 43. These side walls 47 and 48 are bolted to a plate 49, which is disposed beneath the runways 44 and 45 and is preferably reenforced by webs 50. Extending upwardly from plate 49 and between the runways 44 and 45 are walls 51 and 52 on which are formed two pairs of journals 53 and 54. In each pair of journals there is rotatably mounted an axle, 55 and 56, the ends of which are attached to rollers 38 and 39, which roll on the tracks 44 and 45. One of these axles, 56, has a gear 57 keyed thereto. In mesh with gear 57 is another gear 58, which is pinned to a shaft 59. On one side of gear 58 shaft 59 is journaled in a bearing 60 formed integral with plate 49 beneath one of the journals 54, and on the other side of gear 58 shaft 59 extends into a sleeve 61, which is pinned, as at 62, to another shaft 63, which is in axial alignment with shaft 59. Shaft 63 is journaled in a bearing 64 formed integral with plate 49 beneath the other bearing 54. From bearing 64 shaft 63 extends through a bearing 65 formed on member 49, and at its end carries a worm wheel 66. A collar 67 interposed between the bearing 65 and the hub of the worm wheel prevents inward movement of the shaft 63, and the abutment of sleeve 61 against bearing 64 prevents outward movement of this shaft. The hub of gear 58 has clutch jaws 70 coacting with clutch jaws 71 on sleeve 61, so that when this clutch is engaged gear 58 will rotate with shaft 63. This clutch is disengaged by sliding gear 58 and its shaft 59 away from the sleeve 61. On the other end of shaft 59 is secured a sleeve 72, which has clutch jaws 73, coacting with clutch jaws 74 on a sleeve 75, which is pinned to a stub shaft 76, mounted for rotation in a journal 77 formed on side wall 47. On the outer end of shaft 76 is carried a gear 78, with which meshes a pinion 79 on a stub shaft 81 carried on the wall 47 and rotatable by means of hand wheel 80. When gear 58 is moved to the left (Fig. 4), its connection with shaft 63 is broken, and it becomes connected with shaft 76 through the engagement of clutch jaws 73 and 74. Thus, when the parts are in this position, the welding unit supporting member 46 may be moved longitudinally on the stationary support 41 by rotating hand wheel 80.

The connection between gear 58 and shaft 63 permits similar movement by power means through an enclosed shaft 82 which is carried on brackets 83 mounted on wall 48, the shaft at one end having a worm 84 in mesh with worm wheel 66 and having at its other end a worm wheel 85 which meshes with a worm 86 driven by a motor 87 through suitable gearing 88. The motor and gearing is mounted on the movable support 46.

One of the features of this invention is the protection of the rollers and their runways from contact with sparks emitted during welding operations, and also from dust and dirt, thus insuring even and unobstructed movement of the welding units along the stationary table. To aid in maintaining smooth and even movement, the tracks are machined and well lubricated. The importance of maintaining unobstructed movement of each welding unit will become apparent hereinafter.

Bolted to the top of movable member 46 are castings 90, which carry rollers 91. Resting on rollers 91 is the carriage 92, having downwardly-presented runways or tracks 93. Carriage 92 carries the welding apparatus consisting of a wire-reel 94 and a welding-head which in its entirety is designated 95. Both the reel and the welding-head are insulated from the carriage 92. Reel 94 is supported by brackets 96, which rest on insulation block 97 and are bolted to the carriage 92 as at 98, the bolts being insulated from the brackets by suitable insulating bushing 99 and washer 100.

Each welding-head 95 is broadly conventional, comprising a motor 101, which, through suitable reduction gearing contained in housing 102, drives the wire feed rollers 103. The wire 104 from the reel 94 is engaged between these feed rollers 103 and extends through guide sleeve 105 into position for performing the welding operations. Preferably the welding-head is mounted so as to be adjustable in a limited degree on the carriage 92. It also must be insulated therefrom. The various items of the welding head are mounted on a casting 107, which is rigidly carried on the shaft 106. Shaft 106 is rotatably mounted in bearings 108, provided on a plate 109, which is bolted, as at 110, to the carriage 92. This plate 109 is insulated from the carriage 92 by the interposed insulation block 111 and insulating bushings 112 and washers 113. Shaft 106 has worm teeth 114, and on the bearing member 108 is carried a small worm 115 in mesh with teeth 114. Worm 115 is rotatable by means of a knurled knob 116, whereby the shaft 106 may be rotated relatively to the carriage 92 with the pivot point at this shaft. The purpose of permitting this adjustment is to provide means for bringing the end of the welding wire into exactly the proper location for performing the welding operations.

Pneumatic means are provided for moving the carriage 92 and all the apparatus carried thereby crosswise of the longitudinally movable frame 46. Obviously, manual means may be employed for effecting this movement. As shown, a cylinder 120 is secured to the carriage or frame 46. Within this cylinder is a double-acting piston 121 having a piston rod 122 fixed to a bracket 123 secured to the cross-carriage 92. An adjustable stop bolt 124 limits forward movement of the carriage 92.

As before stated, each motor 87 drives its carriage 46, and all other apparatus mounted thereon, longitudinally. Means are provided for stopping the carriage movement at the end of the welding stroke and for automatically returning the carriage to initial welding position. To this end an angle iron 130 is secured to the rear of the two standards 40, and slidably adjustable along this angle iron are two pair of blocks 131, one pair for each welding unit. Each block straddles a flange of the angle iron and may be locked in place by set screw 132. On each block is a pivoted pawl 133 and a stop pin 134. Each carriage 46 carries a reversing switch 135 on a bracket 136, and the switch has a forked operating member 137, which, when it approaches a block 131 receives the pawl 133 and by reason of stop pin 134 throws the switch, but on reverse movement of the carriage the pawl is free and the switch is not thrown. At the end of the welding movement the switch is thrown to reverse the circuit to the motor 87, and when the carriage has returned to initial position the switch is set to pass the current in the opposite direction to permit starting of motor 87 by the operator, or to start the motor automatically to cause forward travel of the carriages, as desired.

The jig unit comprises two lower beams 140 supported on casters 141, preferably arranged to roll in channel tracks 142 located on the floor. Bolted to and extending between and beyond the beams 140 is a frame casting 143 to which the jig parts are secured. The ends of this frame are detachably secured to the standards 40 by angle irons 144, when welding is to be done. Centrally on the top of frame 143 is an annular pedestal 145 on which the housing sections 146 rest. The housing sections are placed in accurate alignment and are held tightly clamped together and held against distortion by the heat of welding. The housing is placed in accurate position on the jig, and the lines to be welded are placed in an exact predetermined location so that the welding wire will align therewith accurately, without requiring adjustment of the welding machine or jig for each housing to be welded.

After the housing has been engaged on the jig in the manner stated, the operator operates the valve 300 to cause air from a supply coming from pipes 301 and passing through pipes 302 into the port 303 of cylinders 120 to bring the welding units forwardly into position over the housing. If more accurate adjustment is necessary, the operator accomplishes this by turning knobs 116. After adjustment for the first housing, adjustment for succeeding housings is required very seldom. Having obtained proper adjustment of the welding wire over the seams to be welded, the operator actuates the switches 304 to start the motors 87, which move the welding units along the housing seams to be welded, and the seams are welded automatically by the apparatus heretofore described. The operation of the welding head is well known and, therefore, a detailed description thereof is believed to be unnecessary. Should the operator wish to stop the travel of either or both of the welding units, he actuates one or both of the switches 304 accordingly. Otherwise the units travel the full length of the seam to be welded and until switches 136 are actuated by their stop blocks 131 to reverse the motor and cause return movement of the welding units to initial position. After the welding is completed, the operator turns valves 300 to exhaust air through ports 303 of cylinders 120 and to cause air to pass through pipes 306 to ports 307 of these cylinders, thus causing the welding units to be moved away from the housing. The operator may cause this movement at any time he so desires.

The jig and housing thereon are suitably grounded, as by conventional ground wires 400, attached to the frame 143 of the jig. Obviously, the grounds may be established at other places, and either directly to the housing, or to the jig or to any desired part, so long as the ground established is conducive to proper and reliable welding by means of the apparatus employed. The circuit wires to the welding heads are shown at 299.

Preferably the edges of the housing are arranged to meet in a V, as at 309, which fills up with the welding flux, and thus a very strong weld is obtained. This V-shaped seam, however, is optional.

As before stated, whenever the welding arc becomes extinguished, the advancing of the welding head ceases, and as soon as the arc is restored the advance movement resumes. This may be accomplished by placing the arc in the circuit which drives the motor 87, the circuit for reversing the motor, however, is not through the arc.

Although the machine above described as illustrating one specific embodiment of our invention has been designed primarily for welding axle housings, it is readily apparent that machines adapted to operate on other articles may be built in accordance with and under our invention herein disclosed. Obviously, many changes can be made in the construction and as the invention can have many embodiments, apparently differing from each other in a wide degree, it is to be understood that all matter contained in the above description or shown in the accompanying drawings shall be interpreted as illustrative and not in a limiting sense. It is also to be understood that the invention is not limited to the specific features of construction, arrangement of parts or combinations of elements, shown or described, but that the scope of the invention is as broad as is indicated in the claims which follow.

What we claim is:

1. In an apparatus of the character described, in combination, a movable jig and automatic welding apparatus for automatically welding seams on work engaged on said jig, guide arms projecting laterally from said welding apparatus, and shoe members secured to said movable jig and adapted to slide along said arms, said welding apparatus including a welding unit and means for moving said unit bodily along said work during the welding, said unit including an automatic welding head.

2. In an apparatus of the character described, in combination, a movable jig and automatic welding apparatus for automatically welding seams on work engaged on said jig, guide arms projecting laterally from said welding apparatus, and shoe members secured to said movable jig and adapted to slide along said arms, said welding apparatus including a welding unit, means for moving said unit bodily along said work during the welding, said unit including an automatic welding head, and means for moving said welding unit transversely of the work on said jig, into and out of operative position with respect thereto.

3. In an apparatus of the character described, in combination, a movable jig and automatic welding apparatus for automatically welding seams on work engaged on said jig, guide arms projecting laterally from said welding apparatus, and shoe members secured to said movable jig and adapted to slide along said arms, said welding apparatus including a welding unit and means for advancing the unit along said work during welding of the work and for returning said unit to initial position after the finish of the welding stroke.

4. In an apparatus of the character described, in combination, a movable jig and automatic welding apparatus for automatically welding seams on work engaged on said jig, guide arms projecting laterally from said welding apparatus, and shoe members secured to said movable jig and adapted to slide along said arms, said welding apparatus including a welding unit, means for moving said unit bodily along said work during the welding, said unit including an automatic welding head, and a carrier for said welding head, said welding head being adjustable on said carrier to permit more accurate registration thereof with the work on the jig.

5. In automatic welding apparatus of the character described, a table including standards and an inverted channel-shaped plate mounted on said standards, said plate having inwardly directed tracks within said channel, whereby said tracks are covered and protected.

6. In automatic welding apparatus of the character described, in combination, a table including standards and an inverted channel-shaped plate mouted on said standards, said plate having inwardly directed tracks within said channel, a carriage having rollers resting on said tracks, said tracks and rollers being covered and protected by said channel plate.

7. In automatic welding apparatus of the character described, in combination, table having tracks, a carriage including axles having rollers resting on said tracks, a driven gear on one of said axles, a driving gear on said carriage in mesh with said gear, a shaft on each side of said driving gear, and a clutch intermediate each shaft and said gear, power means for rotating one of said shafts to drive said driving gear to move said carriage on said table, and manually operable means for rotating the other shaft to drive said driving gear to move said carriage on said table.

8. In automatic welding apparatus of the character described, in combination, a table having tracks, a carriage including axles having rollers resting on said tracks, a driven gear on one of said axles, a driving gear on said carriage in mesh with said gear, a shaft on each side of said driving gear, and a clutch intermediate each shaft and said gear, power means for rotating one of said shafts to drive said driving gear to move said carriage on said table, and manually operable means for rotating the other shaft to drive said driving gear to move said carriage on said table, said driving gear being adjustable axially with respect to said shafts, and the adjustment of said clutches corresponding to the axial adjustment of said driving gear.

9. In automatic welding apparatus of the character described, in combination, a table having tracks, a carriage including axles having rollers resting on said tracks, a driven gear on one of said axles, a driving gear on said carriage in mesh with said gear, a shaft on each side of said driving gear, and a clutch intermediate each shaft and said gear, power means for rotating one of said shafts to drive said driving gear to move said carriage on said table, and manually operable means for rotating the other shaft to drive said driving gear to move said carriage on said table, said power means including a motor on said carriage and gearing immediate said motor and one of said shafts.

10. In automatic welding apparatus of the character described, in combination, a table, a carriage movable along said table, upwardly presented rollers on the top of said carriage, and a carrier having tracks resting on said rollers, said carrier having a portion extending over and about said rollers and tracks whereby said rollers and tracks are protected.

11. In automatic welding apparatus of the character described, in combination, a table, a carriage movable along said table, rollers secured to the top of said carriage, a carrier including an inverted channel-shaped plate having downwardly presented tracks on the base wall of said channel, resting on said rollers, the bottom and side walls of said channel being over and about said tracks and rollers, and said rollers and tracks being covered and protected thereby.

12. In automatic welding apparatus of the character described, in combination, a table having longitudinal tracks, a carriage having supporting rollers resting on said tracks, supported rollers on said carriage in a vertical plane at right angles to the plane of said supporting rollers, a carrier having tracks resting on said supported rollers, and a welding head supported on said carrier, said welding head being movable with its carrier transversely of said carriage and table, and being movable with said carrier and carriage longitudinally of said table.

13. In automatic welding apparatus of the character described, in combination, a carrier having brackets, a shaft journaled in said brackets, a welding head carrier on said shaft, and means for rotatively adjusting said shaft in said brackets, said welding head being pivotally adjustable on said carrier, said adjusting means including a worm manually rotatable on one of said brackets and teeth on said shaft in mesh with said worm.

14. In automatic welding apparatus of the character described, in combination, a table, a carriage movable on said table, a welding unit mounted on said carriage, and movable in a plane transverse to the plane of travel of the carriage, and means, including an electric motor, for moving said carriage along the table, the circuit for said motor passing through the welding arc of said welding unit, whereby when said arc is extinguished said motor ceases to rotate and said carriage ceases to advance along said table, and when said arc is present said motor rotates and said carriage advances along said table.

15. In automatic welding apparatus of the character described, in combination, a traveling carriage, an automatic welding head mounted on said carriage, and movable in a plane transverse to the plane of travel of the carriage, said welding head being operative to automatically dispense welding wire in accordance with conditions of the welding arc, and means automatically responsive to conditions of the welding arc determining the travel of the carriage.

This specification signed this 28th day of December, 1927.

WALTER H. D'ARDENNE.
J. OLIN LANDIS.
LEWIS H. CHRISTENSEN.